US006590641B2

(12) United States Patent
Yu

(10) Patent No.: US 6,590,641 B2
(45) Date of Patent: Jul. 8, 2003

(54) COUNTERFEIT MONEY DETECTOR WITH FRONT HOOD

(76) Inventor: Hung-Ming Yu, No. 879-1, Zhong Zheng Rd., Xin-Zhuang City, Taipei Hsien (TW)

( * ) Notice: Subject to any disclaimer, the term of this patent is extended or adjusted under 35 U.S.C. 154(b) by 14 days.

(21) Appl. No.: 10/002,151

(22) Filed: Dec. 5, 2001

(65) Prior Publication Data

US 2003/0103198 A1 Jun. 5, 2003

(51) Int. Cl.$^7$ .................................................. G06K 9/74
(52) U.S. Cl. ........................................................ 356/71
(58) Field of Search ......................... 356/71; 250/458.1, 250/461.1, 485.1, 504 R, 504 H, 559.39; 382/100, 112, 135

(56) References Cited

U.S. PATENT DOCUMENTS 5,874,742 A * 2/1999 Romano .................. 250/461.1
5,918,960 A * 7/1999 Hopwood et al. ............ 356/71
5,942,759 A * 8/1999 Romano .................. 250/461.1
6,438,262 B1 * 8/2002 Bernardini et al. ......... 382/135
6,470,093 B2 * 10/2002 Liang ......................... 382/135

* cited by examiner

*Primary Examiner*—Michael P. Stafira
(74) *Attorney, Agent, or Firm*—Birch, Stewart, Kolasch & Birch, LLP

(57) ABSTRACT

A counterfeit money detector with front hood comprising a C-shaped body with an open hole on front, a transparent hood covering the open hole, a cover plate on the transparent hood, a 1$^{st}$ infrared transmitter is on the inner bottom of the C-shaped body to transmit IR signals, a 1$^{st}$ infrared receiver is on the inner top of the C-shaped body to receive IR signals from the 1$^{st}$ infrared transmitter. When the cover plate blocks the IR signals, the 1$^{st}$ infrared receiver will generate a control signal out to an activating circuitry, an ultraviolet lamp installed on the inner top of the C-shaped body and connected to the activating circuitry. When the IR signals are blocked, the ultraviolet lamp is turned on by the activating circuitry; otherwise the ultraviolet lamp remains off.

3 Claims, 8 Drawing Sheets

COUNTERFEIT MONEY DETECTOR WITH FRONT HOOD

BACKGROUND OF THE INVENTION

I. Field of the Invention

This invention relates generally to a counterfeit money detector with front hood and, more specifically, to a counterfeit money detector with front hood that can activate ultraviolet lamp automatically to identify if the paper money is real or fake, and have a transparent hood on front to block the ultraviolet rays.

II. Description of the Prior Art

It is known counterfeit money appears from time to time. Counterfeit money can influence financial structure, also cause great loss to general stores. The best way to identify whether the paper money is real or counterfeit is to see the fluorescent fiber on the paper money. The faster and more convenient way is to apply the ultraviolet rays to identify if fluorescent fiber exists. Therefore some small ultraviolet ray counterfeit money detector are available on the market, they are made of a shell with ultraviolet rays internally, a switch to turn on and off the ultraviolet rays to identify the paper money.

However most of the known ultraviolet ray counterfeit money detectors have to be turned on, off manually, not so convenient to operate. The energy is wasted if the switch of the ultraviolet ray counterfeit money detector is left on accidentally, also shortens the life of the ultraviolet lamp. If the ultraviolet lamp left on might also cause damage to users' eyes and skin. There is some room for improvement.

SUMMARY OF THE INVENTION

It is therefore a primary object of the invention to provide a counterfeit money detector with front hood that can activate the ultraviolet lamp on and off to identify the paper money is real or fake.

In order to achieve the objective set forth, a counterfeit money detector with front hood in accordance with the present invention comprises a C-shaped body with an open hole on front, a transparent hood covering the open hole, a cover plate on the transparent hood, a 1$^{st}$ infrared transmitter is on the inner bottom of the C-shaped body to transmit IR signals, a 1$^{st}$ infrared receiver is on the inner top of the C-shaped body to receive IR signals from the 1$^{st}$ infrared transmitter. When the cover plate blocks the IR signals, the 1$^{st}$ infrared receiver will generate a control signal out to an activating circuitry, an ultraviolet lamp installed on the inner top of the C-shaped body and connected to the activating circuitry. When the IR signals are blocked, the ultraviolet lamp is turned on by the activating circuitry; otherwise the ultraviolet lamp remains off.

BRIEF DESCRIPTION OF THE DRAWINGS

The accomplishment of the above-mentioned object of the present invention will become apparent from the following description and its accompanying drawings which disclose illustrative an embodiment of the present invention, and are as follows.

DESCRIPTION OF THE PREFERRED EMBODIMENT

Figure 1:
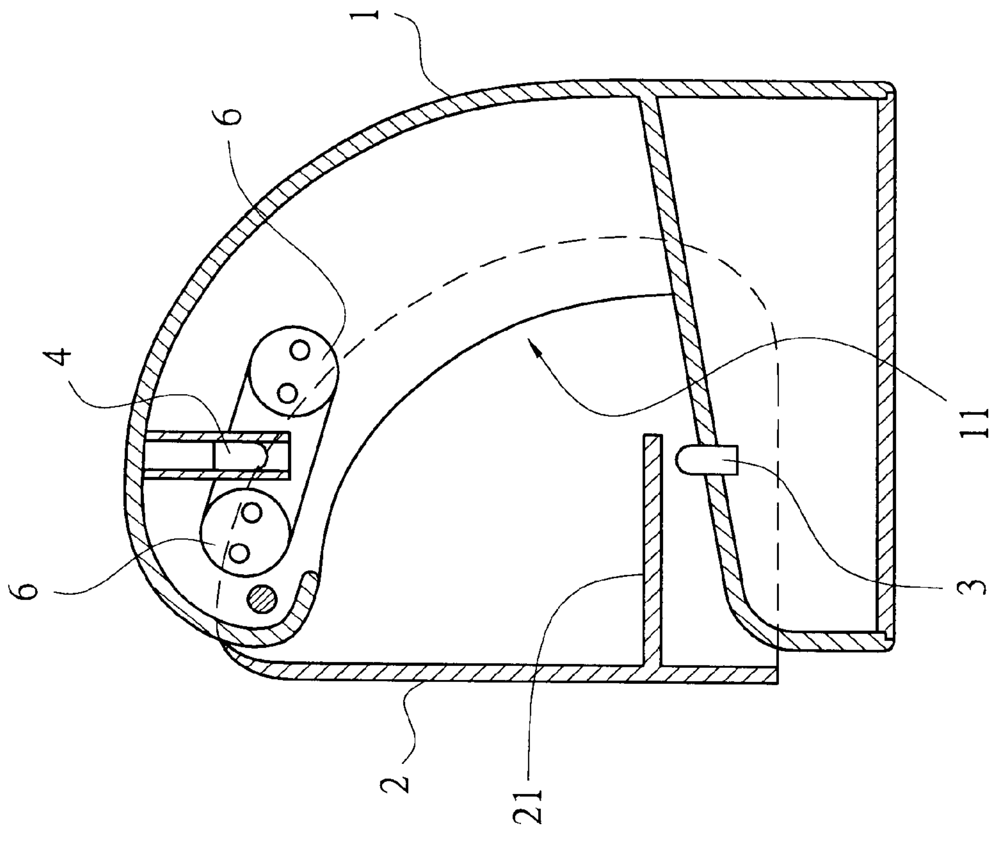
FIG. 1 is a cross-sectional view of the present invention when the transparent hood is moved down.
Figure 2:
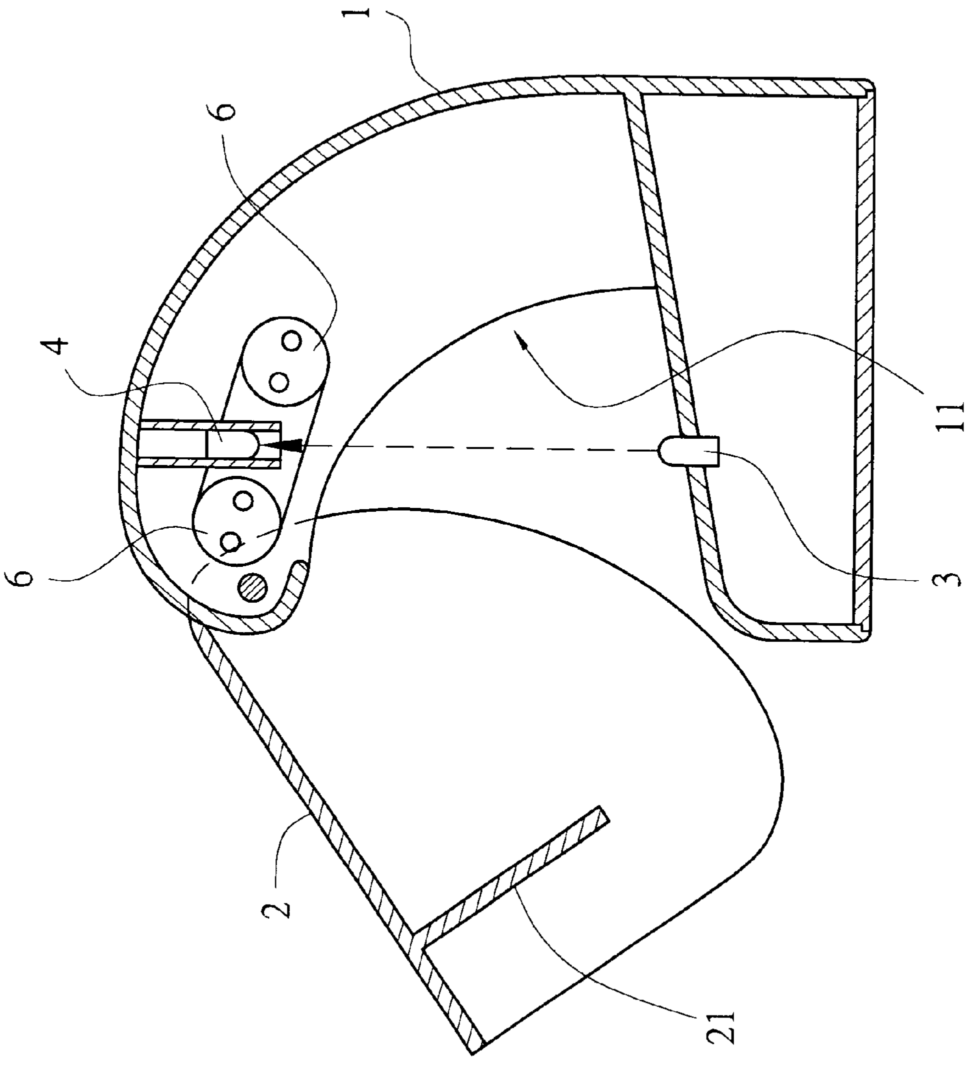
FIG. 2 is another cross-sectional view of the present invention the transparent hood is lifted up.
Figure 3:
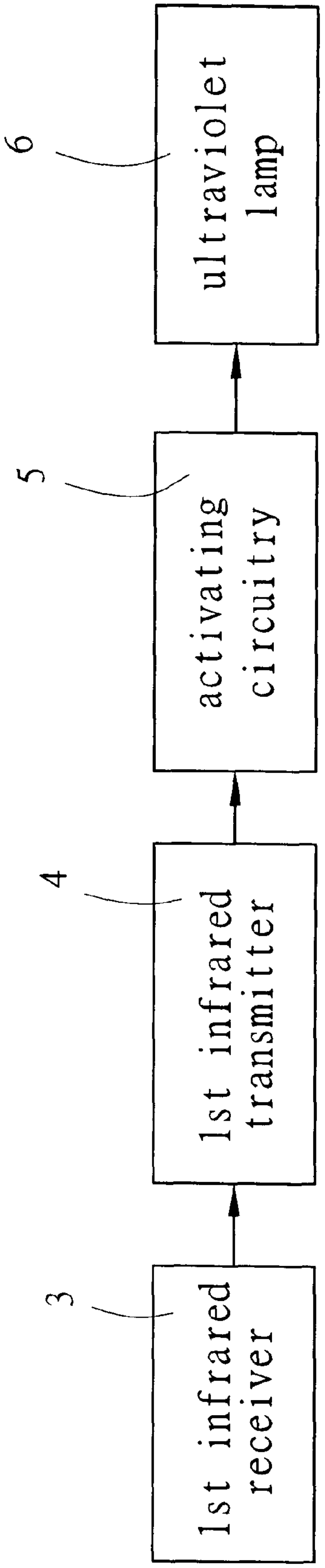
FIG. 3 is a block diagram of the circuit of the present invention.

Referring to FIG. 1, FIG. 2 and FIG. 3, the present invention is composed of following:

- a C-shaped body 1 with an open hole 11 on front;
- a transparent hood 2 covering the open hole 11 with a cover plate 21 thereof;
- a 1$^{st}$ infrared transmitter 3 is on the inner bottom of the C-shaped body 1 to transmit IR(infrared) signals;
- a 1$^{st}$ infrared receiver 4 is on the inner top of the C-shaped body 1 to receive IR signals from the 1$^{st}$ infrared transmitter 3; when the IR signals are blocked, the 1$^{st}$ infrared receiver 4 will generate a control signal out;
- an activating circuitry 5 connects to the 1$^{st}$ infrared receiver 4; the activating circuitry 5 receives the control signals from the 1$^{st}$ infrared receiver 4;
- an ultraviolet lamp 6 is installed on the inner top of the C-shaped body 1 and connected to the activating circuitry 5, the ultraviolet lamp 6 is controlled by the activating circuitry 5 to turn on or off.

Based on above structure, the transparent hood 2 in front of the open hole 11 of the C-shaped body 1 is lifted up, as shown in FIG. 2, the paper money is inserted from the open hole 11 of the C-shaped body 1, then the transparent hood 2 is closed, as shown in FIG 1. Since both the 1$^{st}$ infrared transmitter 3 and the 1$^{st}$ infrared receiver 4 are installed correspondent on inner top and inner bottom of the C-shaped body 1, therefore when the transparent hood 2 is moved down, the IR signals from the 1$^{st}$ infrared transmitter 3 is blocked by the cover plate 21 of the transparent hood 2, and causes 1$^{st}$ infrared receiver 4 can not receive any signal, that triggers 1$^{st}$ infrared receiver 4 sends a control signal to activating circuitry 5, which further has the activating circuitry 5 turn on the ultraviolet lamp 6 to identify if the paper money is real for fake. When the ultraviolet lamp 6 is on, the transparent hood 2 can block the ultraviolet rays to avoid eyes from seeing the harmful rays.

When the transparent hood 2 is lifted up to take out paper money, as shown in FIG. 2, the 1$^{st}$ infrared receiver 4 can receive signals from the 1$^{st}$ infrared transmitter 3, that stops the 1$^{st}$ infrared receiver 4 from sending out control signals to the activating circuitry 5 that further turns off the ultraviolet lamp 6.

Lifting the transparent hood 2 can turn the ultraviolet lamp 6 off automatically; close the transparent hood 2 can turn the ultraviolet lamp 6 on; such mechanism is very convenient to the users to avoid turn on and off the power switch. While not using (the transparent hood 2 is lifted up) the ultraviolet lamp 6 is off to preserve the life of the ultraviolet lamp 6. It also protects eyes and skin of the users by avoiding the exposure of the ultraviolet rays.

Figure 4:
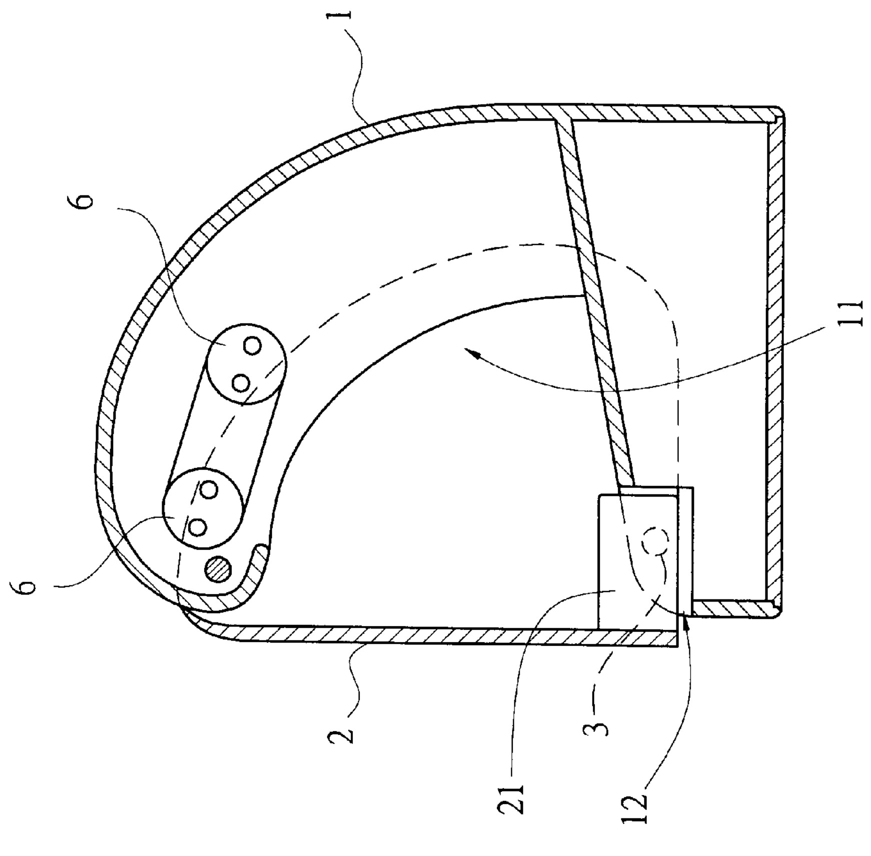
FIG. 4 is an assembly cross-sectional view of another embodiment of the present invention.
Figure 5:
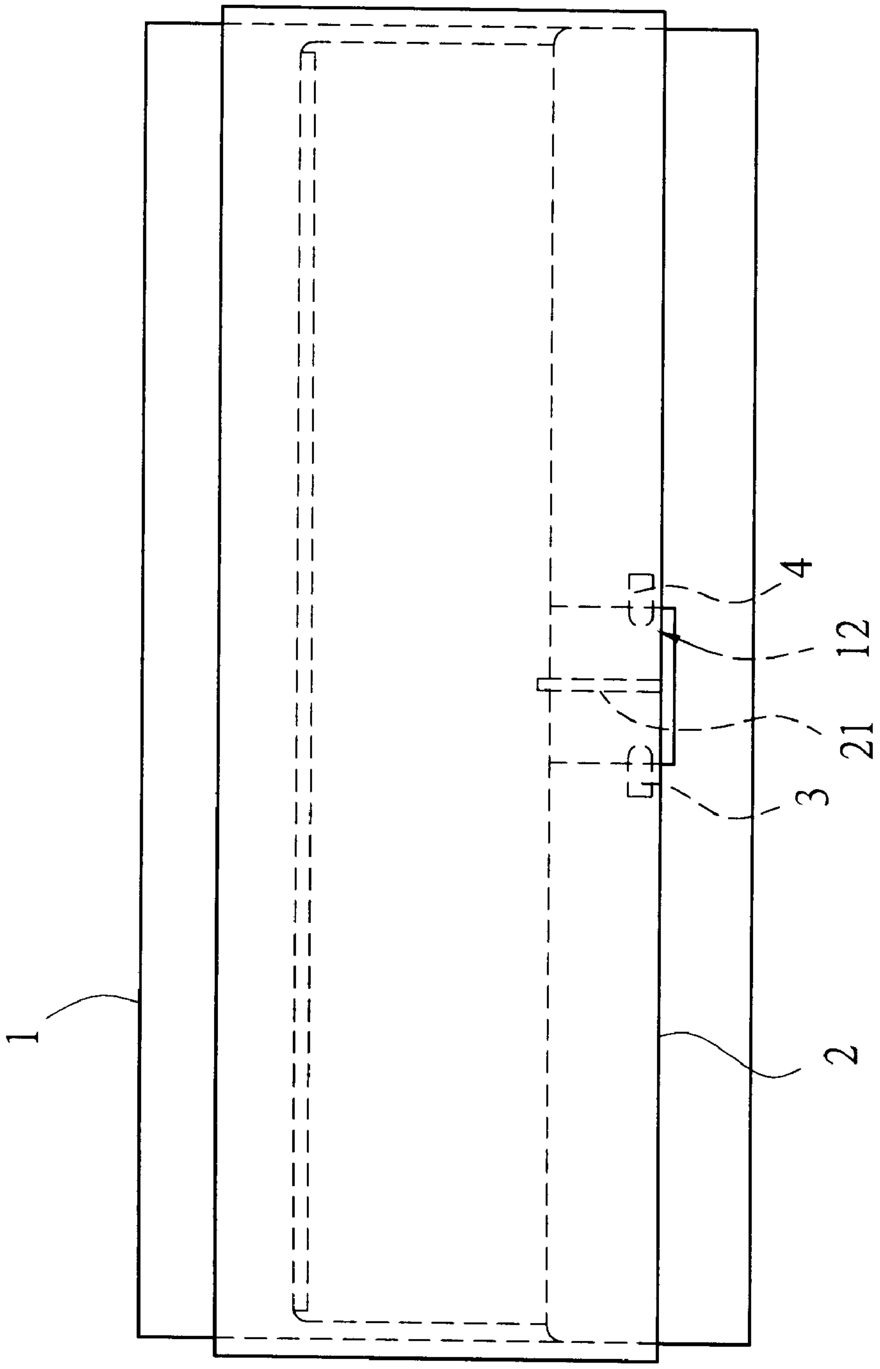
FIG. 5 is an assembly front-view of another embodiment of the present invention.

Another embodiment of the present invention, referring to FIG. 4 and FIG. 5, a paper money input slot 12 is installed on the front of the C-shaped body 1. A 1$^{st}$ infrared receiver

4 and a $1^{st}$ infrared transmitter 3 are fixed on both end of the paper money input slot 12. The direction of the cover plate 21 of the transparent hood 2 is changed from horizontal to vertical and the location is changed to inside of the paper money input slot 12 and in the transmission path of the $1^{st}$ infrared receiver 4 and the $1^{st}$ infrared transmitter 3 to achieve the same block effect.

Figure 6:
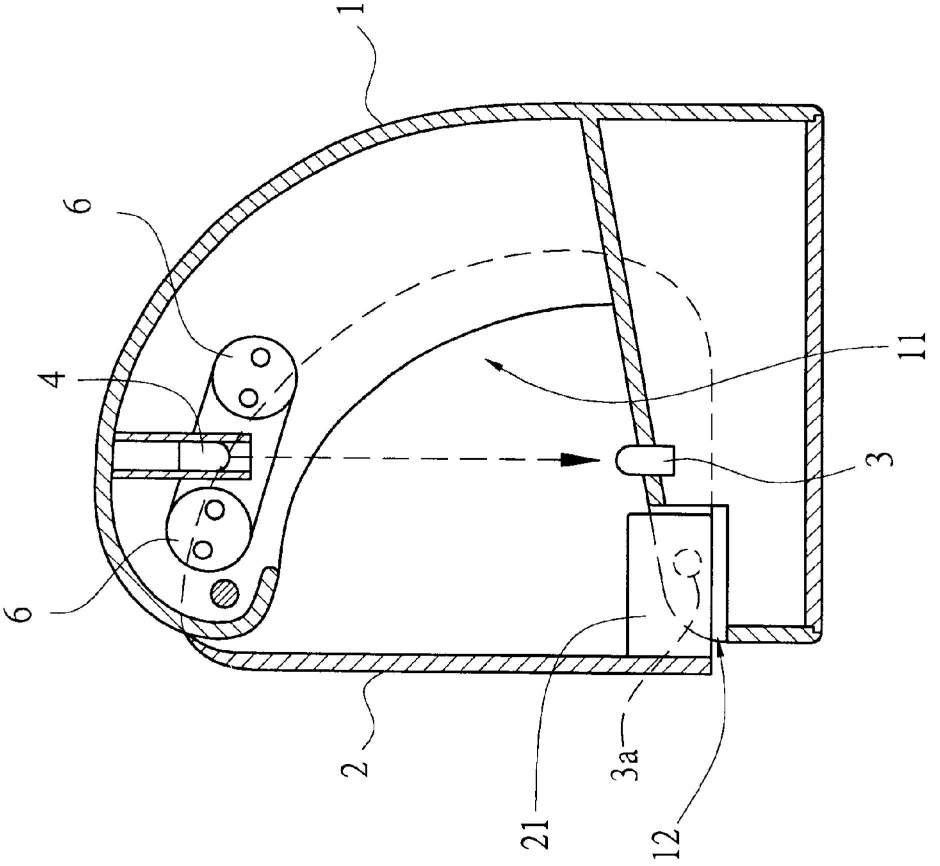
FIG. 6 is an assembly cross-sectional view of a further embodiment of the present invention.
Figure 7:
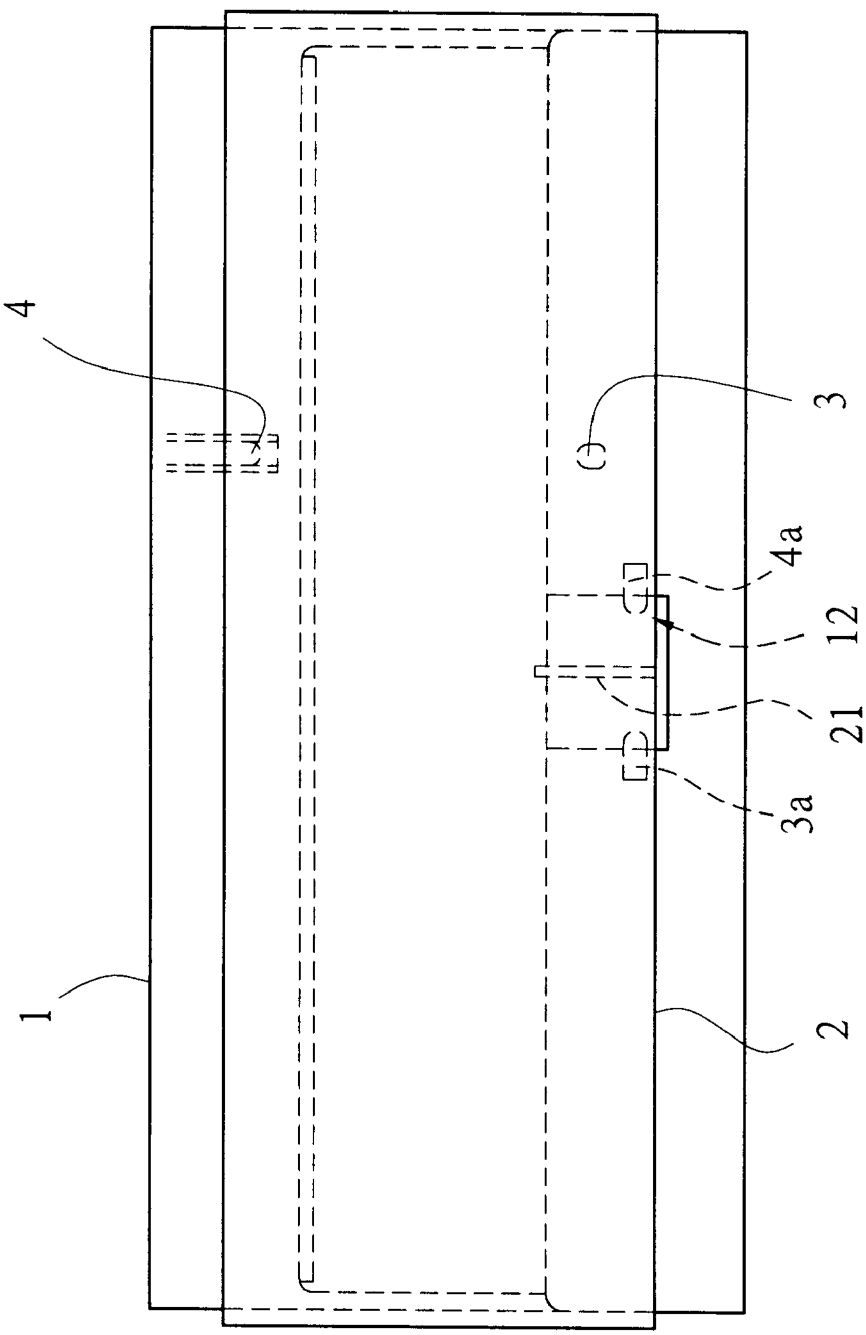
FIG. 7 is an assembly front-view of a further embodiment of the present invention.
Figure 8:
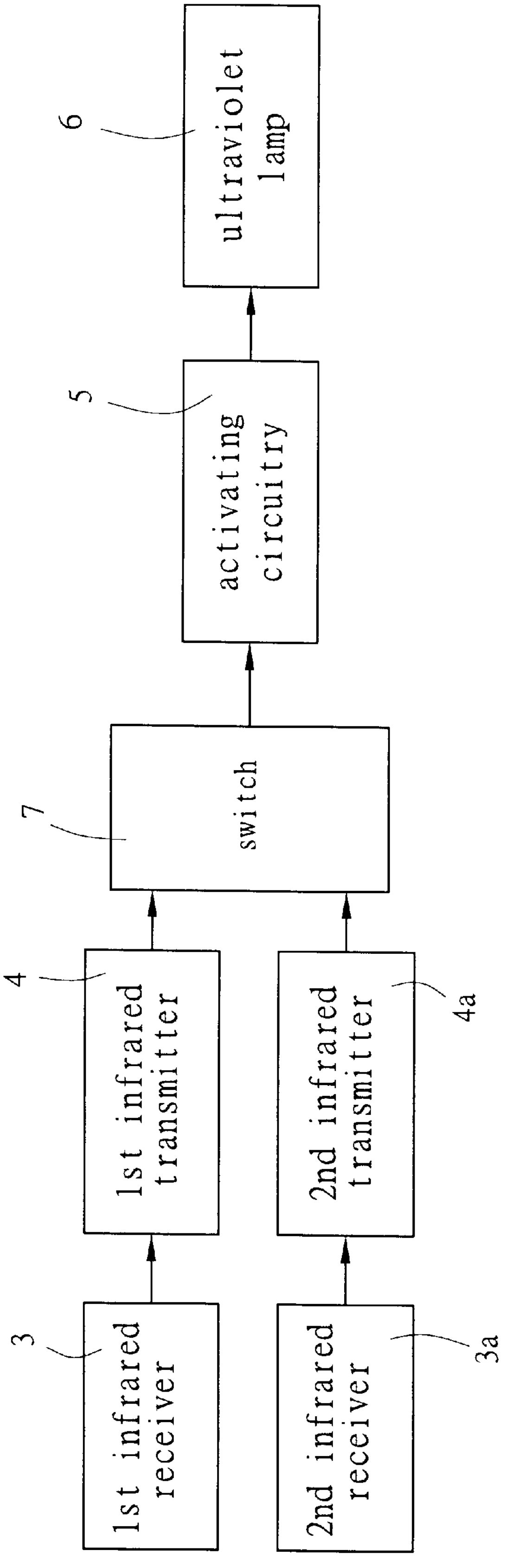
FIG. 8 is a block diagram of the circuit of the embodiment shown in FIG. 6 and FIG. 7.

A further embodiment of the present invention, referring to FIG. 6 and FIG. 7, a paper money input slot 12 is installed on the front of the C-shaped body 1. A 2nd infrared receiver 4*a* and a 2nd infrared transmitter 3*a* are fixed on both end of the paper money input slot 12. The direction of the cover plate 21 of the transparent hood 2 is changed from horizontal to vertical and the location is changed to inside of the paper money input slot 12 and in the transmission path of the 2nd infrared receiver 4*a* and the 2nd infrared transmitter 3*a*. The $1^{st}$ infrared receiver 4, the $1^{st}$ infrared transmitter 3 is connected in parallel with the 2nd infrared receiver 4*a*, the 2nd infrared transmitter 3*a*. A switch 7, as shown in FIG. 8, switches the signal blocking function between the 1st infrared receiver 4, the 1st infrared transmitter 3 and the 2nd infrared receiver 4*a*, the 2nd infrared transmitter 3*a*.

The switch 7 can convert the control to the $2^{nd}$ infrared transmitter 3*a* and $2^{nd}$ infrared receiver 4*a*: the lifting or closing of the transparent hood 2 makes the cover plate 21 block the signals from the $2^{nd}$ infrared transmitter 3*a* to have the transparent hood 2 to control the ultraviolet lamp 6 on and off. If the switch 7 is convert to $1^{st}$ infrared transmitter 3 and the $1^{st}$ infrared receiver 4, then when the transparent hood 2 is lifted up and the paper money is inserted into, the signals of the $1^{st}$ infrared transmitter 3 will be blocked and turn on the ultraviolet lamp 6, the ultraviolet lamp 6 is off when the paper money is out, such mechanism can keep checking the paper money without lifting and closing the transparent hood 2, more convenient to use.

While a preferred embodiment of the invention has been shown and described in detail, it will be readily understood and appreciated that numerous omissions, changes and additions may be made without departing from the spirit and scope of the invention.

What is claimed is:

1. A counterfeit money detector with front hood comprising:

a C-shaped body with an open hole on front;

a transparent hood pivoted on said C-shaped body with a cover plate located inside, covering said open hole;

a $1^{st}$ infrared transmitter located on the inner bottom of said C-shaped body to transmit IR signals;

a $1^{st}$ infrared receiver located on the inner top of said C-shaped body to receive IR signals from said $1^{st}$ infrared transmitter, when the IR signals are blocked, said $1^{st}$ infrared receiver generates a control signal out;

an activating circuitry connecting to and receiving control signal from said $1^{st}$ infrared receiver;

an ultraviolet lamp installed on the inner top of said C-shaped body and connected to and turned on and off by said activating circuitry.

2. The counterfeit money detector with front hood recited in claim 1, wherein said C-shaped body having a paper money input slot, said $1^{st}$ infrared receiver and said $1^{st}$ infrared transmitter are fixed on both end of said paper money input slot, the direction of said cover plate of said transparent hood is changed from horizontal to vertical and the location is changed to inside of said paper money input slot and in the IR transmission path of said $1^{st}$ infrared receiver 4 and said $1^{st}$ infrared transmitter to achieve the same block effect.

3. The counterfeit money detector with front hood recited in claim 1, wherein said C-shaped body having a paper money input slot, a 2nd infrared receiver and a 2nd infrared transmitter are fixed on both end of said paper money input slot, the direction of said cover plate of said transparent hood is changed from horizontal to vertical and the location is changed to inside of said paper money input slot and in the IR transmission path of said 2nd infrared receiver and said 2nd infrared transmitter;

said $1^{st}$ infrared receiver, said $1^{st}$ infrared transmitter is connected in parallel with said 2nd infrared receiver, said 2nd infrared transmitter, a switch switches the signal blocking function between said 1st infrared receiver, said 1st infrared transmitter and said 2nd infrared receiver, said 2nd infrared transmitter.

* * * * *